United States Patent
Liu et al.

(10) Patent No.: US 9,281,526 B1
(45) Date of Patent: Mar. 8, 2016

(54) BATTERIES WITH REPLENISHABLE STORAGE CAPACITIES

(75) Inventors: Ping Liu, Irvine, CA (US); John Wang, Glendora, CA (US); Souren Soukiazian, Agoura, CA (US)

(73) Assignee: HRL Laboratories, LLC, Malibu, CA (US)

( * ) Notice: Subject to any disclaimer, the term of this patent is extended or adjusted under 35 U.S.C. 154(b) by 982 days.

(21) Appl. No.: 12/629,066

(22) Filed: Dec. 2, 2009

(51) Int. Cl.
 *H01M 4/02* (2006.01)
 *H01M 8/02* (2006.01)

(52) U.S. Cl.
 CPC . *H01M 8/02* (2013.01); *H01M 4/02* (2013.01)

(58) Field of Classification Search
 USPC .......................................................... 429/221
 See application file for complete search history.

(56) References Cited

U.S. PATENT DOCUMENTS

| | | | |
|---|---|---|---|
| 2008/0032197 A1* | 2/2008 | Horpel et al. | 429/224 |
| 2008/0050644 A1* | 2/2008 | Christensen et al. | 429/50 |
| 2008/0055819 A1 | 3/2008 | Taguchi et al. | |
| 2008/0070122 A1* | 3/2008 | Park et al. | 429/330 |

FOREIGN PATENT DOCUMENTS

| EP | 1 973 188 A1 | 9/2008 |
|---|---|---|
| EP | 1973188 | * 9/2008 |

* cited by examiner

*Primary Examiner* — Jacob Marks
(74) *Attorney, Agent, or Firm* — O'Connor & Company

(57) ABSTRACT

This invention provides batteries with improved calendar and cycle lifetimes. A rechargeable battery comprises an additional electrode that includes active ions, such as lithium ions. Cell capacity of the battery can be increased by supplying these active ions to the anode or the cathode. In some variations, this invention provides a lithium-ion battery comprising an anode, a cathode, an electrolyte, and an additional lithium-containing electrode, wherein the additional lithium-containing electrode is capable of supplying lithium ions to the anode or the cathode in the presence of an electrical current.

20 Claims, 4 Drawing Sheets

BATTERIES WITH REPLENISHABLE STORAGE CAPACITIES

FIELD OF THE INVENTION

The present invention generally relates to improved battery structures whose electrical storage capacity can be effectively replenished.

BACKGROUND OF THE INVENTION

Batteries based on lithium (Li), such as lithium-ion batteries, are attractive due to their high energy density compared to other commercial batteries. Lithium-ion batteries are used commercially in computers, cell phones, and related devices. Battery lifetime is often a critical factor in the marketplace, especially for commercial, military, and aerospace applications. Battery life is often the limiting factor in many aerospace products, such as satellites.

Lithium-ion batteries have potential for use in electric vehicle/hybrid-electric vehicle (EV/HEV) applications. In recent years, commercial efforts have attempted to improve lithium-ion batteries to meet the requirements demanded for target applications. Particularly for EV/HEV applications, long cycle life is a critical requirement. Presently, this requirement has not been met.

Previous methods of extending battery life include employing long-life cathode and anode materials, and restricting battery operation to avoid conditions detrimental to battery life. Examples of such conditions include high and low temperatures, high depths of discharge, and high rates. These restrictions invariably lead to under-utilization of the battery, thus lowering its effective energy density. In addition, precise control of cell temperature with aggressive thermal management on the pack level is usually required, which adds significantly to system weight, volume, and cost. Even with these operation and design restrictions, battery life is still limited to at most a few thousand cycles.

In light of these and other shortcomings in the art, improved battery structures are needed. What is needed is a low-cost approach to increase the calendar and cycle lifetimes of lithium-ion batteries, while maintaining full utilization of the battery. Improved batteries should offer equal or higher energy density compared to state-of-the-art batteries, while preferably having longer cycle and calendar lifetimes by including means for reviving and restoring capacity.

SUMMARY OF THE INVENTION

The present invention addresses the aforementioned needs in the art, as will now be summarized and further described in detail below.

In some variations, this invention provides a lithium-ion battery comprising an anode, a cathode, an electrolyte, and an additional lithium-containing electrode, wherein the additional lithium-containing electrode is capable of supplying lithium ions to the anode or the cathode. In some embodiments, the lithium-containing electrode is configured to supply lithium ions to the anode when in the presence of an electrical current. Alternatively, or additionally, the lithium-containing electrode can be configured to supply lithium ions to the cathode when in the presence of an electrical current.

The cell capacity of the battery increases when the lithium ions (from the lithium-containing electrode) are supplied to the anode or the cathode. In some embodiments, the additional lithium-containing electrode contains an amount of lithium representing at least 20%, such as at least 50%, of initial cell capacity. In certain embodiments, the lithium-containing electrode contains an amount of lithium representing at least the initial cell capacity.

The anode can include, for example, an element selected from the group consisting of carbon, silicon, aluminum, tin, and any combinations thereof.

The cathode can include, for example, $LiMO_2$ wherein M is selected from Co, Ni, Mn, or combinations thereof. In some embodiments, the cathode includes $LiM_2O_4$ wherein M is selected from Mn, Ti, Ni, or combinations thereof; and/or $LiMPO_4$ wherein M is selected from Fe, Mn, Co, or combinations thereof.

In some embodiments, the additional lithium-containing electrode comprises (and in certain embodiments, consists essentially of) lithium metal. In various embodiments, the lithium-containing electrode comprises an element selected from the group consisting of carbon, silicon, aluminum, tin, and any combinations thereof; and/or one or more lithium-metal oxides of Co, Ni, Mn, and Ti; and/or lithium-metal phosphates of Fe, Mn, and Co.

In certain embodiments, the invention provides a lithium-ion battery comprising a carbon anode, a $LiFePO_4$ cathode, an electrolyte, and a lithium-metal electrode capable of supplying lithium ions to the anode or the cathode in the presence of an electrical current.

Other variations of the present invention are not limited to lithium-ion batteries, but utilize the principles set forth herein to provide a rechargeable or replenishable battery. These other variations relate to a rechargeable battery comprising an anode, a cathode, an electrolyte, and an additional electrode, wherein the additional electrode is capable of supplying active ions to the anode or the cathode in the presence of an electrical current.

In some embodiments, a rechargeable battery is provided, wherein cell capacity of the battery increases when the active ions are supplied to the anode or the cathode. The additional electrode can contains an amount of active ions representing at least 20%, such as 50%, 100%, or more, of initial cell capacity.

DETAILED DESCRIPTION OF EMBODIMENTS OF THE INVENTION

Figure 1:
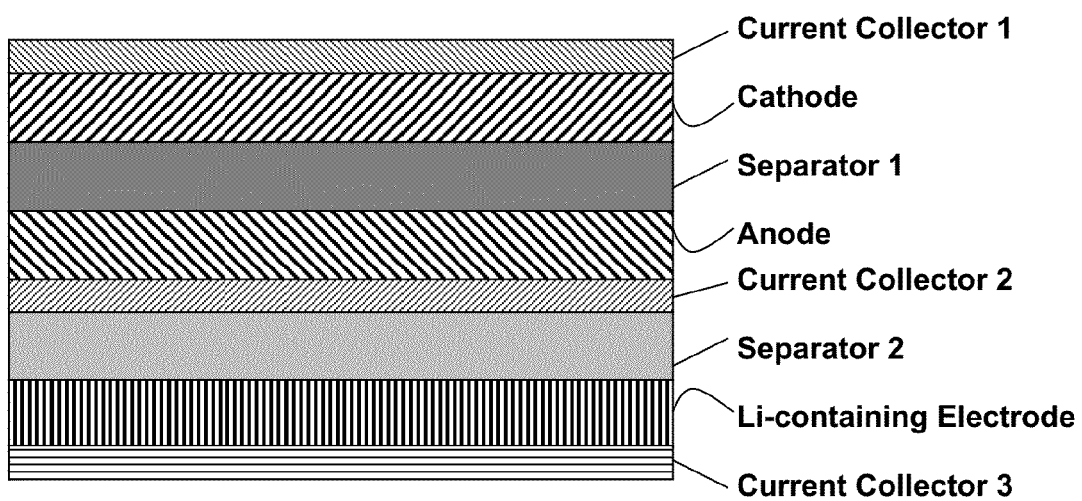
FIG. 1 depicts a cross-section of a lithium-ion battery, in accordance with some variations of the invention.

The apparatus, methods, and systems of the present invention will be described in detail by reference to various non-limiting embodiments of the invention.

Unless otherwise indicated, all numbers expressing dimensions, capacities, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques. As used in this specification and the appended claims, the singular forms "a," "an," and "the" include plural referents unless the context clearly indicates otherwise.

The primary functional components of a typical lithium-ion battery are the anode, cathode, and electrolyte, in which a lithium ion moves between the anode and cathode in the electrolyte. A separator is used to separate cathode and anode to prevent electron shortage. Current collectors, normally metal, are used to collect electrons from both cathode and anode. The lithium ion moves from the anode to the cathode during discharge and from the cathode to the anode when charging.

Both the anode and cathode are materials into which and from which lithium can migrate. The process of lithium moving into the anode or cathode is referred to as insertion (or intercalation), and the reverse process, in which lithium moves out of the anode or cathode is referred to as extraction (or deintercalation).

The present invention is premised, at least in part, on the realization that a third electrode, comprising stored lithium, can be included in a lithium-ion battery structure to enable exceptionally long calendar and cycle life. Under normal battery operation (i.e., current flow between anode and cathode), the third electrode remains idle. After the battery capacity decays due to loss of active lithium, the third electrode can be configured to introduce active lithium, thus increasing the instant capacity of the battery.

Variations of the invention provide increased battery calendar and/or cycle life by 50%, 100%, 200%, 300% or more (compared to batteries without the addition of the third electrode) while maintaining full utilization of the battery. For example, when long-life cathode materials such as $LiFePO_4$ are employed, battery cycle life can be extended to tens of thousands of cycles.

Embodiments of the present invention will now be described in detail, including reference to the accompanying figures. The figures provide representative illustration of the invention and are not limiting in their content. It will be understood by one of ordinary skill in the art that the scope of the invention extends beyond the specific embodiments depicted; specifically, the invention is not limited to lithium-ion batteries. This invention also incorporates routine experimentation and optimization of the methods, apparatus, and systems described herein.

FIG. 1 is a schematic of a lithium-ion battery that includes a lithium-containing electrode to provide active lithium, on demand, to restore battery capacity when desired. In FIG. 1, a cathode coated on current collector 1 faces an anode coated on current collector 2, separated by a layer (separator 1). This sandwich structure is similar to state-of-the-art-lithium-ion batteries, as is known. The structure of FIG. 1 further includes a lithium-containing electrode layer between separator 2 and current collector 3.

For various reasons, battery capacity can decrease over time, or as a result of certain dynamic conditions within the battery. The lithium-containing electrode in FIG. 1 is capable of restoring lost battery capacity as follows. During normal battery operation, a current flows between current collectors 1 and 2, while lithium ions travel between the cathode and the anode through separator 1. When it is desired to restore at least some of the original battery capacity, the battery should first be put to rest (no current flowing between the cathode and the anode). Then, either the cathode or the anode can be discharged against the lithium-containing electrode. When the cathode is to be discharged against the lithium-containing electrode, a current will flow between current collectors 1 and 3. When the anode is to be discharged against the lithium-containing electrode, a current will flow between current collectors 2 and 3.

The amount of lithium to be provided by the lithium-containing electrode can vary, depending on how much capacity restoration is desired. Preferably, the discharging of the anode or cathode against the lithium-containing electrode is controlled so that it is at most the capacity loss the battery has suffered. Too much discharging of the anode or cathode against the lithium-containing electrode can cause excess lithium to be supplied, which could lead to lithium-metal plating on the anode.

In preferred embodiments, the battery is constructed from cathode and anode materials with good cycling stability. In these embodiments, battery performance decay with time and cycling is mainly due to the loss of active lithium traveling between the anode and cathode. It is also preferred that the battery does not experience large resistance increases during any performance decay.

The cathode material preferably exhibits long cycle life and calendar life, and does not experience significant resistance increase throughout the life of the battery. The cathode material can be, for example, a lithium metal oxide, phosphate, or silicate. Exemplary cathode materials suitable for the present invention include, but are not limited to, $LiMO_2$ (M=Co, Ni, Mn, or combinations thereof); $LiM_2O_4$ (M=Mn, Ti, or combinations thereof); $LiMPO_4$ (M=Fe, Mn, Co, or combinations thereof); and $LiM_xM'_{2-x}O_4$ (M, M'=Mn or Ni). Preferably, the cathode material consists essentially of $LiFePO_4$.

The cathode may further comprise one or more conductive fillers to provide enhanced electronic conductivity. Examples of conductive fillers include, but are not limited to, conductive carbons, graphites, activated carbon fibers, non-activated carbon nanofibers, metal flakes, metal powders, metal fibers, carbon fabrics, metal mesh, and electrically conductive polymers. The cathode may also further comprise other additives such as, for example, alumina, silica, and transition-metal chalcogenides.

The cathode may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, polytetrafluoroethylenes, polyvinylidene fluorides, ethylene-propylene-diene rubbers, polyethylene oxides, acrylates, methacrylates, divinyl ethers, and the like.

The anode material preferably exhibits long cycle life and calendar life, and does not experience significant resistance increase throughout the life of the battery. Exemplary anode materials suitable for the present invention include, but are not limited to, carbon materials such as graphite, coke, soft carbons, and hard carbons; and metals such as Si, Al, Sn, or alloys thereof. Other exemplary anode materials include titanium oxides, germanium, copper/tin, and lithium compounds containing metal oxides, such as oxides of W, Fe, and Co. Anodes can also include fillers, binders, and current collectors.

Preferably, the anode material consists essentially of graphitic carbon or another electron-conducting carbon. Some examples of electron-conducting carbon include natural graphites, such as flaky graphite, plate-like graphite, and other types of graphite; high-temperature sintered carbon products obtained, for example, from petroleum coke, coal coke, celluloses, saccharides, and mesophase pitch; artificial graphites, including pyrolytic graphite; carbon blacks, such as acetylene black, furnace black, Ketjen black, channel black, lamp black, and thermal black; asphalt pitch, coal tar, active carbon, mesophase pitch, and polyacetylenes.

The lithium-containing electrode must be capable of storing large quantities of lithium, i.e. sufficient initial lithium storage capacity for later increasing or restoring battery capacity. In some embodiments, the lithium-containing electrode includes lithium metal. In certain embodiments, the lithium-containing electrode consists essentially of lithium metal.

Other exemplary lithium-containing electrode materials suitable for the present invention include, but are not limited to, $LiMO_2$ (M=Co, Ni, Mn, or combinations thereof); $LiM_2O_4$ (M=Mn, Ti, or combinations thereof); $LiMPO_4$ (M=Fe, Mn, Co, or combinations thereof); and $LiM_xM'_{2-x}O_4$ (M, M'=Mn or Ni). Still other exemplary lithium-containing electrode materials include lithium-containing compounds of carbon materials such as graphite, coke, soft carbons, and hard carbons; and lithium alloys of metals such as Si, Al, and Sn.

Current collectors collect electrical current generated and provide an efficient surface for attachment of the electrical contacts leading to the external circuit. The current collectors 1, 2, and 3 as shown in FIG. 1 can be made from any suitable materials, such as (but not limited to) Al, Cu, or Ni. The current collectors can also be fabricated from alloys, such as stainless steel. In some exemplary embodiments, current collector 1 is substantially Al and current collectors 2 and 3 are each substantially Cu.

Physically, the current collectors 1, 2, and 3 can be thin foils, such as foils with thicknesses in the 5-50 μm range. To facilitate replenishment of active lithium through a discharge with the lithium-containing electrode, the foils preferably include holes to allow lithium ions to pass. The holes can be imparted by etching or some other means. The holes can be round, square, or some other shape.

Other configurations that can be used for the current collectors include metal meshes, metal nets, perforated metal, metallized plastic films, metal grids, expanded metal grids, metal wools, woven carbon fabrics, woven carbon meshes, non-woven carbon meshes, and carbon felts.

Separators 1 and 2 as shown in FIG. 1 can be fabricated from any suitable material. Examples include cellulosic materials (e.g., paper), non-woven fabrics (e.g., cellulose/rayon non-woven fabric), microporous resin films, and porous metal foils. These separators are preferably soaked in an organic electrolyte, so the separator material should be stable in the presence of the selected organic electrolyte.

Lithium-ion batteries include a liquid electrolyte to conduct lithium ions. The liquid electrolyte acts as a carrier between the cathode and the anode when the battery passes an electric current through an external circuit, and also between the lithium-containing electrode and the cathode or anode when replenishing the battery capacity in accordance with this invention.

The electrolyte generally includes a solvent and a lithium salt (anion plus lithium cation). Examples of the solvent that can be used include aprotic organic solvents, such as propylene carbonate, ethylene carbonate, butylene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, dioxane, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, 1,3-propanesultone, N-methyl acetamide, acetonitrile, acetals, ketals, sulfones, sulfolanes, aliphatic ethers, cyclic ethers, glymes, polyethers, phosphate esters, siloxanes, dioxolanes, and N-alkylpyrrolidones. Ethylene carbonate and propylene carbonate are preferable. As is known in the art, other minor components and impurities can be present in the electrolyte composition.

Lithium salts include, but are not limited to, $LiClO_4$, $LiBF_4$, $LiPF_6$, $LiCF_3SO_3$, $LiCF_3CO_2$, $LiAsF_6$, $LiSbF_6$, $LiAlCl_4$, LiCl, LiBr, and LiI, which may be used alone or as a mixture of two or more. $LiBF_4$ and $LiPF_6$ are preferable, in some embodiments. The concentration of the salt is not particularly limited, but preferably is about 0.1 to 5 mol/L of the electrolytic solution.

The amount of electrolytes to be used in the battery can vary. Preferred amounts will depend on the amounts of the cathode and anode active material and the size of the battery.

The separator can be an insulating thin film that is high in ion permeability and that has a prescribed mechanical strength. As the material of the separator, an olefin polymer, a fluorine-containing polymer, a cellulose polymer, a polyimide, a nylon, glass fiber, or alumina fiber, in the form of a non-woven fabric, a woven fabric, or a microporous film, can be used.

Battery capacity is primarily determined by the amount of active lithium traveling between the anode and the cathode. When the battery is charged for the first time, lithium leaves the cathode and enters the anode. After all removable lithium leaves the cathode, only part of that lithium is active in the anode because some lithium will typically be lost to form a solid-state electrolyte interface on the anode surface. The anode storage capacity is often designed to be larger than the total active lithium content, to reduce the possibility of saturating the anode and plating metal lithium out (a serious safety concern). During subsequent battery cycles, the amount of active lithium will be smaller than the storage capacity of both the cathode and the anode. Consequently, lithium battery capacity is usually equal to the amount of active lithium. Corrosion of this active lithium during the life of the battery leads directly to capacity loss.

After at least some capacity loss has occurred, battery capacity can be replenished in accordance with this invention. First, the battery is left at open circuit. Then either the cathode or the anode is discharged against the lithium-containing electrode. The amount of charge should be controlled so that it does not exceed the known, calculated, or estimated loss of battery capacity. If desired, this process can be repeated throughout life of the battery. Partial or total capacity replenishment can be conducted 1, 2, 3, 4, 5, or more times for a battery of the invention. The extent of capacity replenishment can be adjusted and can vary, i.e. different quantities of lithium can be supplied across replenishment cycles for a battery.

The amount of lithium initially present in the lithium-containing electrode can vary, depending for example on how much replenishment is prescribed for a battery. Preferably, sufficient lithium is present to perform multiple capacity replenishments to significantly enhance the overall lifetime of a battery. A skilled artisan can calculate the amount of lithium that should be used, given a desired enhanced lifetime for a battery. This enhancement can be expressed as a percentage of the beginning capacity of the battery.

For example, a battery can be declared at its end of life when a loss of capacity of 20% has occurred. If three full replenishments are desired, the lithium-containing electrode needs to hold at least 3×20%=60% equivalent to the cell capacity. As a specific example using this definition of end of life and three full replenishments, a cell with a capacity of 2 Ah should include a lithium-containing electrode holding at least 1.2 Ah of lithium capacity.

Figure 2:
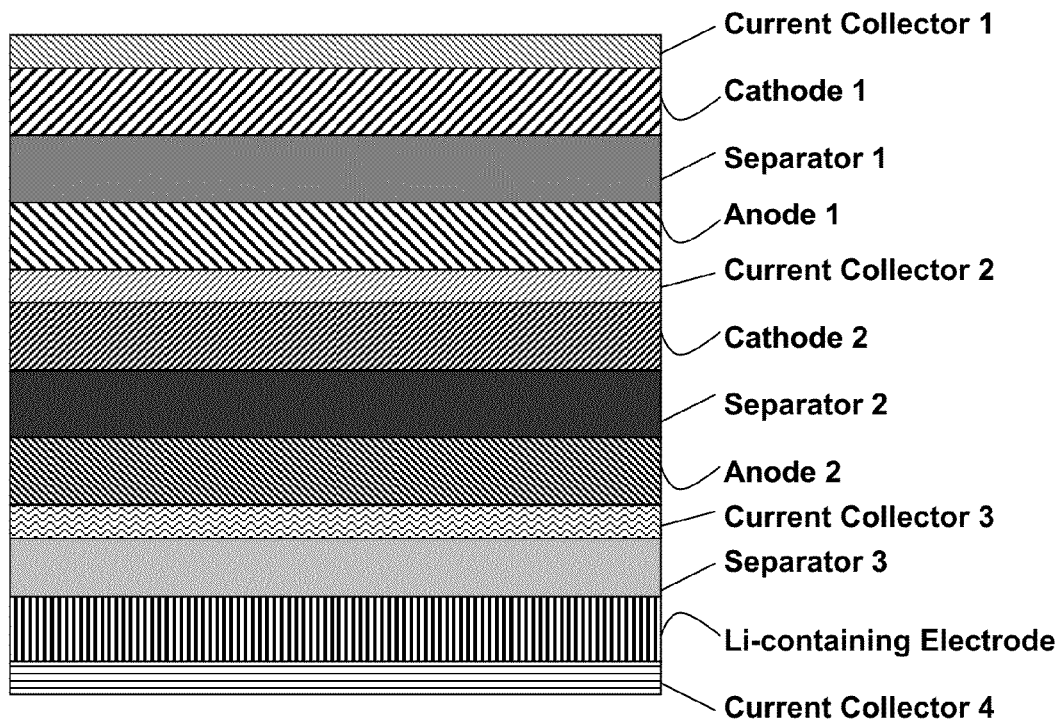
FIG. 2 depicts a cross-section of a multi-layer lithium-ion battery, in accordance with variations of the invention.

In some variations of the invention, the multi-layered structure can be repeated to increase the total capacity of the battery. For example, FIG. 2 is a schematic of a lithium-ion battery that includes a lithium-containing electrode to provide active lithium, on demand, to restore battery capacity when desired. In FIG. 2, cathode 1 is coated on current collector 1 and faces anode 1 coated on current collector 2, separated by separator 1. Cathode 2 is coated on the other side of current collector 2 and faces anode 2 coated on current collector 3, separated by separator 2. The structure of FIG. 2 further includes a lithium-containing electrode layer between separator 3 and current collector 4. The current collectors should be connected together with properly spaced tabs.

The battery can be packaged into either prismatic format cells or cylindrical cells. In the prismatic format, the stacked structure is preferably sealed with a packaging material capable of preventing air and water contamination of the battery. Three terminals should be employed to allow electrical access to the battery—terminals for each of the cathode, the anode, and the lithium-containing electrode. During normal operation, current flows between the cathode and the anode. During lithium replenishment, current flows between (i) the lithium-containing electrode and (ii) the cathode or the anode material.

In the cylindrical format, the multi-layered structure between current collectors 1 and 2 (or duplicates thereof, such as in FIG. 2) will be wound into a jelly roll. The lithium-containing electrode layer can be placed in the outmost layer. The jelly roll can be sealed in a metal container after battery electrolyte is added. Such a battery will have three leads.

Lithium-ion batteries are typically included in a battery pack, which includes a plurality of electrochemical cells that are electrically connected in series and/or in parallel. Lithium-ion battery packs come in many shapes, sizes, capacities, and power ratings, depending on the intended use of the battery pack. Battery packs will typically include a number of lithium-ion cells and a thermal-management system. In preferred embodiments of this invention, the engineering overhead for thermal management is reduced, thus increasing the effective system energy density.

While the addition of the lithium-containing electrode may reduce cell energy density, this reduction will be more than compensated for by the higher depths of discharge and the lower system management overhead. Consequently, the invention can provide batteries with equal or higher energy density and longer cycle life than batteries that do not include an effective lithium-containing electrode.

The extent of reduction of cell energy density depends on the electrode materials and the amount of replenishable lithium. The cathode weight is $W_c$ with a specific capacity of $Q_c$ and the anode weight is $W_a$ with a specific capacity of $Q_a$. After cell formation, the cell capacity can be assumed to be $0.9\,W_c Q_c$, i.e., 10% of cathode capacity is assumed to be lost during cell formation. The lithium storage capacity for the lithium-containing electrode can then be calculated as $0.9 x W_c Q_c$, where x is chosen to provide the desirable amount of lithium for replenishment and can be expressed as a fraction or a percentage.

The weight $W_r$ of the lithium-containing electrode is given by $0.9 x W_c Q_c / Q_r$ where $Q_r$ is the specific capacity for the lithium-containing electrode. The ratio $W_r/(W_c+W_a)$ can be used to determine the weight penalty of adding the lithium-containing storage electrode to the battery. This penalty ratio is $0.9 x W_c Q_c / [Q_r (W_c+W_a)]$.

In LiFePO$_4$ batteries, the specific capacity for the graphite anode is typically about 360 mAh/g, or approximately three times the typical specific capacity for the cathode (about 120 mAh/g). If it is desired to prescribe three capacity replenishments using 20% loss as the end-of-life criterion, then $x=3\times 20\%=60\%$ and $W_r/(W_c+W_a)=0.9\times\frac{3}{4}\times 60\%\times Q_c/Q_r$.

In an exemplary embodiment wherein the anode material is the same as the lithium-containing electrode material, the weight ratio is 13.5%. The actual penalty on the battery capacity will be smaller than 13.5% since active material mass is only part of the battery's weight.

In preferred embodiments, lithium-containing electrode materials of much higher capacity than that of the anode can be used, such as lithium metal or lithiated silicon. In these embodiments, $Q_c/Q_r$ can be less than 1/10, such as 1/20 or less, for lithiated silicon, and even lower for metal lithium. The weight ratio is about 4% for a $Q_c/Q_r$ ratio of 1/10. Consequently, the added weight caused by incorporating a lithium-containing electrode can be minimal.

While metal lithium provides the highest storage capacity for active lithium, it can affect the safety of the battery. However, safety of lithium-metal batteries is usually determined by the increasing surface area and reactivity of the lithium electrode when it is cycled. Dendrites can form during cycling which can cause cell internal shorting. During normal battery operation in the context of variations of the invention, lithium metal is only stored. Lithium is discharged only during replenishment, with no charging event which is typically associated with dendrite formation.

Lithium-ion batteries according to this invention can be suitable for operating across a variety of temperature ranges. The temperature of lithium-ion battery operation can vary, as is known. Exemplary operation temperatures can be from −50° C. to 80° C., such as for military applications. For computers and related devices, as well as for electric-vehicle applications, an exemplary operation range is −30° C. to 60° C.

The discharge capacity C (measured in amp-hour, or Ah) of a lithium-ion battery can be evaluated at various currents or, more commonly, at various C rates. The C rate is conventionally used to describe battery loads or battery charging in terms of time to charge or discharge C amp-hour. The C rate has the units of amp (or ampere), A, and is capacity C divided by time in hours. A C rate of 1 C means 1 hour to discharge C amp-hour. Other C rates can be employed to evaluate discharge capacity, such as C/2 (2 hours of discharge), C/6 (6 hours of discharge), and so on.

Certain embodiments of the present invention will now be further described with reference to the accompanying example, which by no means should be construed to limit the invention.

EXAMPLE 1

This Example 1 relates to experimental replenishment of cell capacity of a LiFePO$_4$/graphite battery.

A commercial 26650 battery is provided (cylindrical cell with 26-mm diameter bottom and 65-mm height, available from, for example, A123 Systems Inc., Boston, Mass.). The battery's initial capacity is 2.2 Ah, and the battery is cycled to induce capacity fade.

The capacity measured at C/2 rate at the end of life is 1.516 Ah. The cell is then opened at one end. The open end is placed in an electrolyte solution of 1 M LiPF$_6$ in ethylene carbonate (EC) and dimethyl carbonate (DMC). A lithium electrode is placed in the electrolyte. The cathode is discharged against the lithium electrode at 0.5 mA for 200 hours. The battery is then left over circuit for 24 hours.

Figure 3:
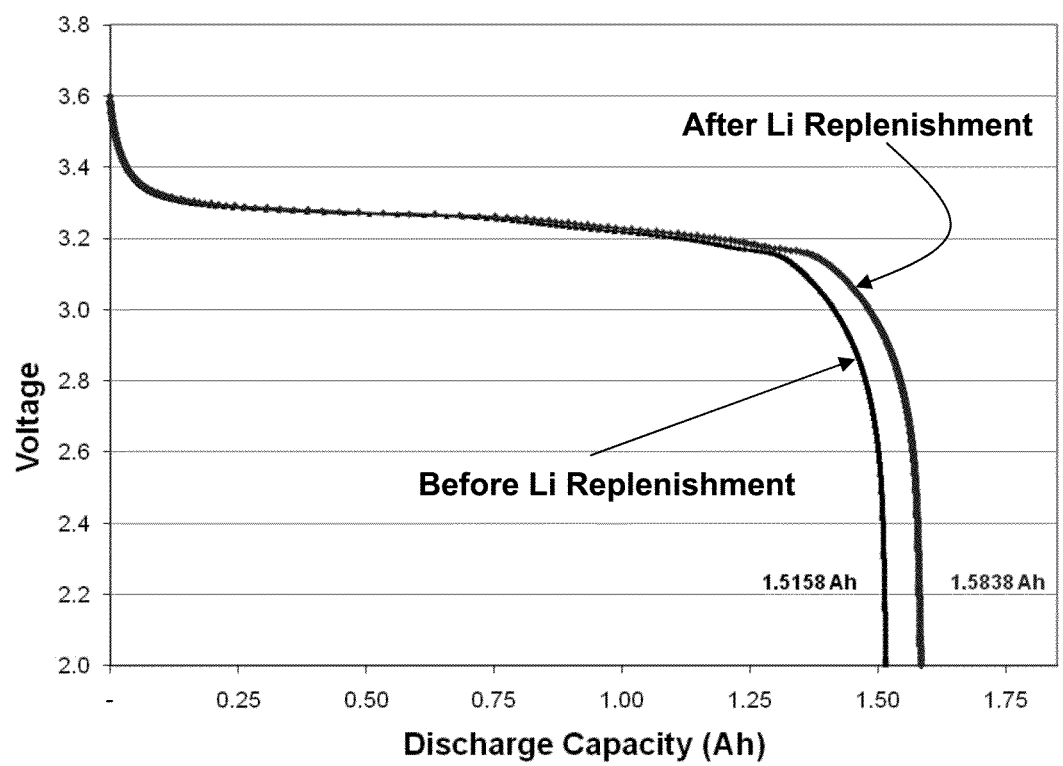
FIG. 3 shows discharge curves (at C/2 rate) of an exemplary $LiFePO_4$ battery before and after replenishment of lithium by discharging the cathode against a lithium-metal electrode.

Subsequently, the battery capacity is measured again at C/2 rate. The capacity measured at C/2 rate is now 1.584 Ah. FIG. 3 shows discharge curves (at C/2 rate) of the LiFePO$_4$ battery before and after replenishment of lithium, where replenishment is accomplished by discharging the cathode against a lithium-metal electrode. According to FIG. 3, the battery discharge capacity actually increases slightly after replenishment of lithium.

EXAMPLE 2

This Example 2 relates to experimental replenishment of cell capacity of a LiFePO$_4$/graphite battery.

A commercial 26650 battery is provided (cylindrical cell with 26-mm diameter bottom and 65-mm height, available from, for example, A123 Systems Inc., Boston, Mass.). The battery has a beginning-of-life capacity of 2.2 Ah. The battery is cycled to induce capacity fade. Capacity measured at C/2 rate at the end of life is measured as 1.514 Ah.

The cell is then opened at one end. The open end is placed in an electrolyte solution of 1 M LiPF$_6$ in ethylene carbonate (EC) and dimethyl carbonate (DMC). A lithium electrode is then placed in the electrolyte. Replenishment of lithium is accomplished by discharging the cathode against the lithium metal electrode.

The cathode is discharged against the lithium electrode at 0.5 mA current for six consecutive periods of lithium replenishment. The amount of lithium inserted and capacity rejuvenation during each of period of lithium replenishment are summarized in Table 1 below. After each period of lithium replenishment, the battery is left over circuit for about 24 hours. Subsequently, after each period, the battery capacity is again measured at C/2 rate.

Figure 4:
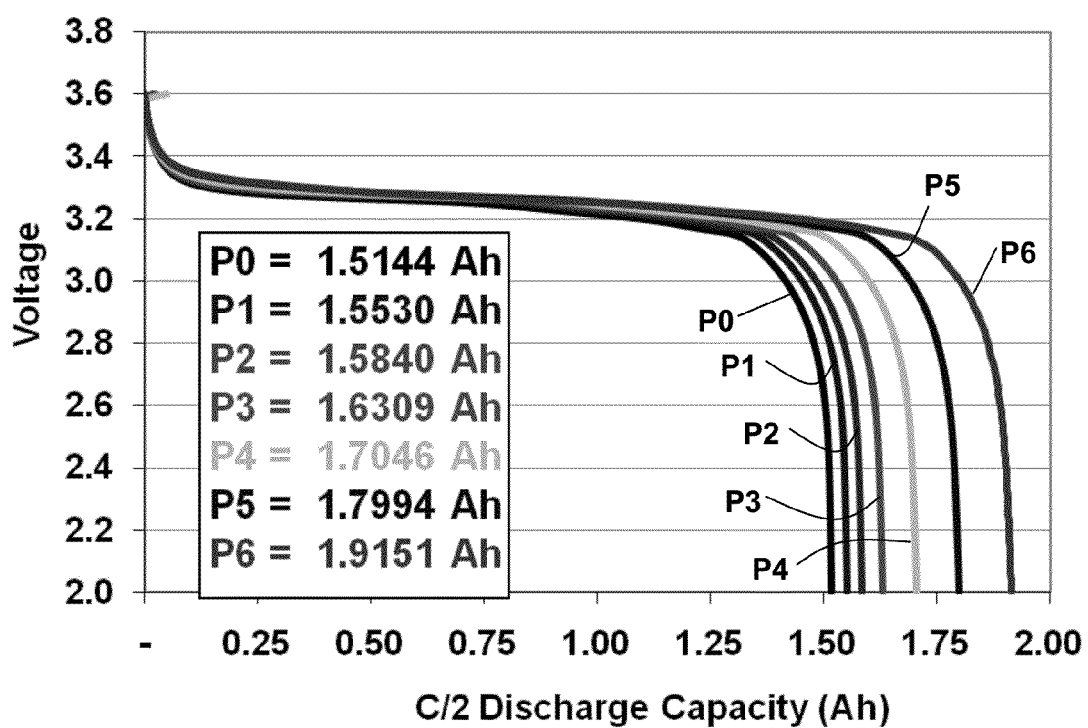
FIG. 4 shows discharge curves (at C/2 rate) of an exemplary $LiFePO_4$ battery after six replenishments of lithium by discharging the cathode against a lithium-metal electrode.

FIG. 4 shows a comparison of discharge curves for this commercial LiFePO$_4$ battery before and after replenishment of lithium. In FIG. 4, P0 denotes the discharge curve before the lithium replenishment; P1, P2, P3, P4, P5, and P6 denote discharge curves after each of the consecutive periods of lithium replenishment. After six periods of lithium replenishment, the cell capacity increases to 1.915 Ah for a total of about 0.4 Ah capacity rejuvenation.

TABLE 1

Summary of cell capacity rejuvenation after each period of lithium replenishment in this Example 2.

|    | Lithium inserted (mAh) | Cell capacity rejuvenated (mAh) |
|----|------------------------|---------------------------------|
| P1 | 50                     | 37                              |
| P2 | 50                     | 31                              |
| P3 | 80                     | 47                              |
| P4 | 150                    | 74                              |
| P5 | 200                    | 95                              |
| P6 | 200                    | 116                             |
| Total | 630                 | 400                             |

Practical applications for this invention include, but are not limited to, laptop computers, mobile phones, cameras, medical devices, electric vehicles, electric bikes, scooters, and power tools. As will be appreciated by a person of skill in this art, the present invention has significant commercial relevance. Battery life is often a critical factor in the marketplace, especially for commercial, military, and aerospace applications (e.g., satellites). Batteries with long lifetimes can reduce warranty and maintenance costs. Also, variations of this invention can allow for simplified thermal-management designs for battery packs, thereby reducing cost and weight.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A lithium-ion battery comprising an anode, a cathode, an electrolyte, an additional lithium-containing electrode for replenishing lithium ions to said anode or said cathode, a current collector layer disposed between said additional lithium-containing electrode and said anode, and a separator layer that separates said current collector layer from said additional lithium-containing electrode, wherein said additional lithium-containing electrode is configured to operate after a normal operation of the cell and when exposed to an electrical current, supplies lithium ions to said anode or said cathode, and wherein said current collector layer is permeable to lithium ions.

2. The lithium-ion battery of claim 1, wherein said lithium-containing electrode is configured to supply lithium ions to said anode when in the presence of said electrical current.

3. The lithium-ion battery of claim 1, wherein said lithium-containing electrode is configured to supply lithium ions to said cathode when in the presence of said electrical current.

4. The lithium-ion battery of claim 1, wherein a cell capacity of said battery increases when said lithium ions are supplied to said anode or said cathode.

5. The lithium-ion battery of claim 1, wherein said additional lithium-containing electrode contains an amount of lithium representing at least 20% of an initial cell capacity.

6. The lithium-ion battery of claim 5, wherein said additional lithium-containing electrode contains an amount of lithium representing at least 50% of said initial cell capacity.

7. The lithium-ion battery of claim 6, wherein said additional lithium-containing electrode contains an amount of lithium representing at least said initial cell capacity.

8. The lithium-ion battery of claim 1, wherein said anode comprises an element selected from the group consisting of carbon, silicon, aluminum, tin, and any combinations thereof.

9. The lithium-ion battery of claim 1, wherein said cathode comprises $LiMO_2$ wherein M is selected from Co, Ni, Mn, or combinations thereof.

10. The lithium-ion battery of claim 1, wherein said additional lithium-containing electrode comprises lithium metal.

11. The lithium-ion battery of claim 10, wherein said additional lithium-containing electrode consists essentially of lithium metal.

12. The lithium-ion battery of claim 1, wherein said current collector layer is adjacent to said separator layer.

13. The lithium-ion battery of claim 1, wherein said separator layer is adjacent to said additional lithium-containing electrode.

14. A lithium-ion battery comprising a carbon anode, a $LiFePO_4$ cathode, an electrolyte, an additional lithium-metal electrode that supplies, when exposed to an electrical current, lithium ions to said anode or said cathode, a current collector layer disposed between said additional lithium-metal electrode and said anode, and a separator layer that separates said current collector layer from said additional lithium-metal electrode, wherein said current collector layer is permeable to lithium ions, and wherein said additional lithium-metal electrode is configured to operate after a normal operation of the cell.

15. A rechargeable battery comprising an anode, a cathode, an electrolyte, an additional lithium-containing electrode that supplies, when exposed to an electrical current, active ions to said anode and said cathode, a current collector layer disposed between said addition lithium-containing electrode and said anode, and a separator layer that separates said current collector layer from said additional lithium containing electrode, wherein said current collector layer is permeable to said active ions, and wherein said additional lithium-containing electrode is configured to operate after a normal operation of the cell.

16. The rechargeable battery of claim 15, wherein cell capacity of said battery increases when said active ions are supplied to said anode or said cathode.

17. The rechargeable battery of claim 15, wherein said additional lithium-containing electrode contains an amount of active ions representing at least 20% of an initial cell capacity.

18. The rechargeable battery of claim 17, wherein said additional lithium-containing electrode contains an amount of active ions representing at least 50% of said initial cell capacity.

19. The rechargeable battery of claim 17, wherein said additional lithium-containing electrode contains an amount of active ions representing at least said initial cell capacity.

20. The rechargeable battery of claim 15, wherein said active ions are lithium ions.

\* \* \* \* \*